(12) United States Patent
Chambers (10) Patent No.: US 10,562,253 B2
(45) Date of Patent: Feb. 18, 2020

(54) METHOD FOR MOLDING AN ARTICLE FROM THERMOSETTING ELASTOMER COMPOSITIONS AND ARTICLE MOLDED

(71) Applicant: NIKE, Inc., Beaverton, OR (US)

(72) Inventor: Clayton Chambers, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 509 days.

(21) Appl. No.: 15/244,414

(22) Filed: Aug. 23, 2016

(65) Prior Publication Data

US 2017/0057189 A1 Mar. 2, 2017

Related U.S. Application Data

(60) Provisional application No. 62/211,403, filed on Aug. 28, 2015.

(51) Int. Cl.
*B29D 35/14* (2010.01)
*B29D 35/04* (2010.01)
(Continued)

(52) U.S. Cl.
CPC ........ *B29D 35/142* (2013.01); *B29C 35/0805* (2013.01); *B29C 35/16* (2013.01);
(Continued)

(58) Field of Classification Search
CPC ................ B29D 35/142; B29D 35/122; B29D 35/0009; B29D 35/04; B29C 43/14;
(Continued)

(56) References Cited

U.S. PATENT DOCUMENTS 2,833,752 A 5/1958 Honn et al.
3,635,933 A 1/1972 Schaffhauser et al.
(Continued)

FOREIGN PATENT DOCUMENTS

CN 101626704 B 7/2012
EP 0183553 A2 6/1986
(Continued)

OTHER PUBLICATIONS

Taiwan Intellectual Property Office, Office Action for TW Application No. 105124419, dated Mar. 26, 2018.
(Continued)

*Primary Examiner* — Robert J Grun
(74) *Attorney, Agent, or Firm* — Honigman LLP; Matthew H. Szalach; Jonathan P. O'Brien (57) ABSTRACT

An article is molded from first and second thermosetting elastomer compositions each comprising free-radically curable elastomer and free radical initiator but different from one another. The first thermosetting elastomer composition is molded to fill a first area of a mold cavity at a first temperature at which the first free radical initiator has a half-life≤about 10 minutes or at which the first thermosetting elastomer composition has an increase in torque less than 10% of a total increase in torque at full cure. The second thermosetting elastomer composition is then inserted into the mold cavity, and the mold is heated to fully cure the article, for example a temperature at which each free radical initiator has a half-life≤about 1 minute, with the second composition filling a second area of the mold cavity before or during heating and curing.

24 Claims, 3 Drawing Sheets

(51) Int. Cl.
| | |
|---|---|
| *B29C 45/16* | (2006.01) |
| *B29C 35/16* | (2006.01) |
| *B29C 45/00* | (2006.01) |
| *B29C 35/00* | (2006.01) |
| *B29C 35/08* | (2006.01) |
| *B29D 35/00* | (2010.01) |
| *B29C 43/14* | (2006.01) |
| *B29D 35/12* | (2010.01) |
| *B29K 21/00* | (2006.01) |
| *B29L 31/50* | (2006.01) |

(52) U.S. Cl.
CPC ............ *B29C 43/14* (2013.01); *B29C 43/145* (2013.01); *B29C 45/0001* (2013.01); *B29C 45/16* (2013.01); *B29C 45/1657* (2013.01); *B29C 45/1671* (2013.01); *B29D 35/0009* (2013.01); *B29D 35/04* (2013.01); *B29D 35/122* (2013.01); *B29C 2035/0811* (2013.01); *B29C 2043/147* (2013.01); *B29C 2045/1664* (2013.01); *B29K 2021/006* (2013.01); *B29K 2995/0021* (2013.01); *B29L 2031/504* (2013.01)

(58) Field of Classification Search
CPC .............. B29C 43/145; B29C 45/1657; B29C 45/0001; B29C 45/16; B29C 45/1671; B29C 35/0805; B29C 35/16; B29C 2043/147; B29C 2045/1664; B29C 2035/0811; B29L 2031/504; B29K 2021/006; B29K 2995/0021
See application file for complete search history.

(56) References Cited

U.S. PATENT DOCUMENTS

| | | | |
|---|---|---|---|
| 3,635,934 | A | 1/1972 | Schaffhauser et al. |
| 3,832,336 | A | 8/1974 | Groepper et al. |
| 4,244,861 | A | 1/1981 | Spenadel et al. |
| 4,370,423 | A | 1/1983 | Rys-sikora |
| 4,394,459 | A | 7/1983 | Rys-sikora |
| 4,684,672 | A | 8/1987 | Buchanan et al. |
| 5,641,831 | A | 6/1997 | Hamilton |
| 6,506,331 | B2 | 1/2003 | Meguriya |
| 7,074,857 | B2 | 7/2006 | Bendler et al. |
| 7,662,886 | B2 | 2/2010 | Park |
| 8,013,067 | B2 | 9/2011 | Bendler et al. |
| 2001/0025066 | A1 | 9/2001 | Meguriya |
| 2004/0115450 | A1 | 6/2004 | Bendler et al. |
| 2005/0084694 | A1 | 4/2005 | Bendler et al. |
| 2006/0003137 | A1 | 1/2006 | Amstutz et al. |
| 2007/0004865 | A1 | 1/2007 | Park |
| 2009/0022922 | A1 | 1/2009 | Park |
| 2012/0041130 | A1 | 2/2012 | Ye |
| 2015/0011711 | A1 | 1/2015 | Chen |

FOREIGN PATENT DOCUMENTS

| | | |
|---|---|---|
| TW | 201506064 A | 2/2015 |
| TW | 201522439 A | 6/2015 |

OTHER PUBLICATIONS

International Search Report and Written Opinion issued by the European Patent Office acting as International Searching Authority for International patent application No. PCT/US2016/049062, dated Dec. 6, 2016 (9 pages).

Korean Intellectual Property Office, Office Action for KR Application No. 10-2018-7008818, dated Mar. 18, 2019.

METHOD FOR MOLDING AN ARTICLE FROM THERMOSETTING ELASTOMER COMPOSITIONS AND ARTICLE MOLDED

CROSS-REFERENCE TO RELATED APPLICATIONS

This application claims priority to U.S. provisional patent application No. 62/211,403, filed Aug. 28, 2015, which is hereby incorporated in by reference in its entirety.

FIELD OF AND INTRODUCTION TO THE DISCLOSURE

The disclosed technology concerns molding thermosetting elastomers. In a specific aspect, the disclosed technology concerns molding different elastomer compositions together and curing both compositions to a desired degree without scorch.

This introductory information relates to the disclosed technology but may or may not be prior art.

Thermoset elastomers such as rubber can be used in articles to provide properties such as durability, toughness, sealing, cushioning, traction, and electrical insulation. Diene rubber polymers (for example polybutadiene and butadiene copolymers) can be thermoset with a vulcanizing agent such as sulfur along with accelerators and activators or via free radical initiated crosslinking. During the thermosetting process (also called curing or vulcanization), an elastomer becomes crosslinked to a degree that prevents further flow. Crosslinking increases elastic and mechanical properties, but prevents further forming of the article by molding.

As used in this description, "a," "an," "the," "at least one," and "one or more" indicate interchangeably that at least one of the item is present; a plurality of such items may be present unless the context unequivocally indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the technological field with this ordinary meaning, then "about" as used herein indicates at least variations that may arise from ordinary methods of measuring and using such parameters. In addition, disclosures of ranges are to be understood as specifically disclosing all values and further divided ranges within the range. The terms "comprising," "including," and "having" are inclusive and therefore specify the presence of stated features, steps, operations, elements, or components, but do not preclude the presence or addition of one or more other features, steps, operations, elements, or components. As used in this specification, the term "or" includes any one and all combinations of the associated listed items.

As used in this description, a "reinforcement fabric" refers to any woven or nonwoven reinforcement fabric or mat. As is well-known, the half-life of a free radical initiator is determined by differential scanning calorimetry-thermal activity monitoring (DSC-TAM) for the initiator in solution (e.g., in monochlorobenzene) at a dilute concentration (≤0.2 M), except that kinetic data of the decomposition of hydroperoxides in the solution at the dilute concentration are determined titrimetrically. Half-life at a particular temperature is then calculated from the Arrhenius equation. Glass transition temperature is determined by ASTM D3418 (which uses differential scanning calorimetry). Torque of thermosetting elastomers from uncured to fully cured may be determined by ASTM D5289 (Standard Test Method for Rubber Property—Vulcanization Using Rotorless Cure Meters). "Rubber compound" refers to a compounded natural or synthetic rubber polymer composition that cures to form a rubber.

DRAWINGS

Drawings are provided and described to illustrate certain features. The illustrated embodiments do not represent the entire scope of the novel technology presented in this disclosure.

DESCRIPTION

A method of molding an article now disclosed comprises molding a plurality of thermosetting elastomer portions in a mold to form the article, wherein at least two of the portions are molded sequentially, at least the first of which is molded at a first temperature at which the first thermosetting elastomer portion can be molded but all free radical initiator included in the first thermosetting elastomer portion has a long enough half-life such that during the molding time the first thermosetting elastomer portion is not cured or not significantly cured such that the first thermosetting elastomer portion has no increase in torque at the first temperature or has an increase in torque at the first temperature that is less than 10%, or less than 5%, or less than 3%, of a total increase in torque realized at full cure. Further thermosetting elastomer portions may subsequently be molded at the first temperature; in each case, the molded thermosetting elastomer portion has no increase in torque at the first temperature of has an increase in torque at the first temperature that is less than 10%, or less than 5%, or less than 3%, of a total increase in torque realized at full cure. Each further thermosetting elastomer portion that is molded may abut or at least partially overlie a previously molded thermosetting elastomer portion. More than one thermosetting elastomer portion may be molded at a time. For example, one or more thermosetting elastomer portions may be molded at the first temperature, then the mold opened, the molded portions optionally trimmed, then one or more further elastomer portions are placed in the mold. The sequence of molding the newly-placed portion or portions, optionally trimming the molded portion or portions, and placing one or more further elastomer portions in the mold may be repeated. After the last thermosetting elastomer portion is or the last thermosetting elastomer portions are placed in the mold, the mold is closed and further heated to a second, curing temperature and the plurality of thermosetting elastomer portions are cured together to form an article of cured elastomer. After the last thermosetting elastomer portion or portions are placed in the mold and the mold is closed, the last portion or portions may optionally be molded at the first temperature before the mold is heat to the second, curing temperature. The mold can be heated to the second, curing temperature in a rapid heating method such as induction heating, for example heating from the first temperature to the second, curing temperature in from 2 seconds to 5 seconds. The mold is maintained at the second, curing temperature for a time required to complete the cure of the elastomer portions. When the cure of the elastomer portions is completed, the mold is opened and the cured, molded article is removed. The mold is then cooled to the first temperature, for example using convection cooling, to be ready for a next molding cycle at the first temperature.

More than one thermosetting elastomer portion may be molded at a time at the first temperature or during heating to the curing temperature. Each of the plurality of thermosetting elastomer portions may have a single, same free radical initiator, which may be included in all of the thermosetting elastomer portions in a same amount, or each of the plurality of thermosetting elastomer portions may have a same combination of free radical initiators, which may be included in all of the thermosetting elastomer portions in the same amounts as to each of the free radical initiators. Each molding step at the first temperature (placing one or more thermoplastic elastomer portions in the mold, closing the mold and molding the portion or portions, opening the mold and optionally trimming the molded portion or portions) may be from about 3 seconds to about 1 minute in duration, from example from about 5 seconds or from about 10 seconds to about 45 seconds or to about 30 seconds, and the total molding time at the first temperature from the time a first thermoplastic elastomer portion is placed in the mold to the time a last thermoplastic elastomer portion is placed in the mold may be from about 30 seconds to about 5 minutes, for example from about 1 minute or from about 1.5 minutes to about 4 minutes or to about 3 minutes or to about 2 minutes.

The plurality of thermosetting elastomer portions includes thermosetting elastomer portions of at least two different thermosetting elastomer compositions. For example, the plurality may include elastomer portions of at least two different colors. That is, at least one thermosetting elastomer portion has a thermosetting elastomer composition of a color different than the thermosetting elastomer composition another of the thermoplastic elastomer portions. In another example, the plurality of thermosetting elastomer portions may have at least one thermosetting elastomer portion comprising an elastomer polymer that is different from an elastomer polymer of another of the thermosetting elastomer portions. In another example, one thermosetting elastomer portion of the plurality may include a more or less of a component (e.g., elastomer, additive, free radical initiator, colorant, filler) compared to the amount of the component in another thermosetting elastomer portion of the plurality.

A method of molding an article that is also disclosed comprises providing a first portion of a first thermosetting elastomer composition comprising a first free-radically curable elastomer and a first free radical initiator and providing a second portion of a second thermosetting elastomer composition comprising a second free-radically curable elastomer and a second free radical initiator, wherein the first thermosetting elastomer composition is different from the second thermosetting elastomer composition. The first portion is inserted into a mold cavity of a mold that is at a first temperature T1, wherein T1 is above the glass transition temperature ($T_g$) of the first elastomer. The first free radical initiator (and an further free radical initiator that may be present in the first thermosetting elastomer composition) has a half-life at T1 of at least about ten minutes, for example at least about 12 minutes or at least about 15 minutes or at least about 20 minutes or at least about 30 minutes. The mold is closed, and the first portion is heated and molded to fill a first area of the mold cavity. The mold can have an overflow dam into which an excess of the first elastomer composition flows, in which case the excess of the first elastomer composition may be removed from the overflow dam when the mold is opened. The second portion is then inserted into the mold cavity at the first temperature T1. The mold is again closed, the second portion is optionally molded at the first temperature T1, and the mold is heated, for example with induction heating, to heat the first and second portions to a second temperature T2 and cure the first and second portions. The mold can be heated to the second, curing temperature in a rapid heating method such as the induction heating in from 2 seconds to 5 seconds. The mold is maintained at the second, curing temperature for a time required to complete the cure of the elastomer portions. When the cure of the elastomer portions is completed, the mold is opened and the cured, molded article is removed. The mold is then cooled to the first temperature, for example using convection cooling, to be ready for a next molding cycle at the first temperature. Other elastomer portions of the same or different compositions may be molded at the same time as the first portion or at the same time as the second portion.

The first free radical initiator and the second free radical initiator, and any further free radical initiator that may be present in either the first thermosetting elastomer composition or the second thermosetting elastomer composition, each independently has a half-life at T2 of up to about one minute, for example, a half-life of up to about 40 second or up to about 30 seconds or up to about 20 seconds or up to about ten second or a half-life from one second to one minute or from one second to 30 seconds or from one second to 15 seconds or from two seconds to 15 seconds or from two seconds to ten seconds. The second portion is heated and molded to fill a second area of the mold cavity before or during heating the mold to bring the first and second portions to T2. In this context, "before or during" includes before the heating of the mold commences, after heating of the mold commences, or both before and after heating of the mold commences. The mold can have an overflow dam into which an excess of the second elastomer composition flows, in which case the excess of the second elastomer composition may then be removed from the overflow dam before or after heating the mold to T2 and curing. When the second portion is heated and molded to fill the second area of the mold cavity before heating the mold to bring the first and second portions to T2, at the first temperature T1, then T1 is above the glass transition temperature ($T_g$) of the first elastomer the second free radical initiator (and any further free radical initiator that may be present in the second thermosetting elastomer composition) has a half-life at T1 of at least about ten minutes, for example at least about 12 minutes or at least about 15 minutes or at least about 20 minutes or at least about 30 minutes.

The second portion may abut or at least partially overlie the first area of the mold cavity filled by the first portion. Further portions of further thermosetting elastomer compositions may be added sequentially in the same way as the first and second thermosetting elastomer compositions, each being molded to fill a further area of the mold cavity, each time optionally with excess of the further thermosetting elastomer composition flowing into and being removed from an overflow dam. Each further area filled by a further thermosetting elastomer composition may at least partially overlie or abut one or more of the areas of the mold cavity filled by a previously inserted and molded portion. A reinforcement fabric may be inserted into the mold before or after a portion is molded. The reinforcement fabric may lie, at least in part, over or under one or more molded portions or between two of the molded portions, for example at least in part between the first area and the second area (filled respectively by the first portion and the second portion) or between the second area and a third area of the mold cavity filled by molding a third portion of a third thermosetting elastomer composition comprising a third free-radically curable elastomer and a third free radical initiator. In each case, the last portion that is molded may be molded o fill a further area of the mold cavity before or during heating the mold to cure all of the portions of thermosetting elastomeric compositions inserted into the mold to form a cured elastomer article.

Each of the further thermosetting elastomeric compositions inserted into the mold has a free radical initiator, and each free radical initiator of a further thermosetting elastomeric composition, independently of each other free radical initiator of a thermosetting elastomeric composition used in the method, has a half-life at T2 of up to about one minute, for example, a half-life of up to about 40 second or up to about 30 seconds or up to about 20 seconds or up to about ten second or a half-life from one second to one minute or from one second to 30 seconds or from one second to 15 seconds or from two seconds to 15 seconds or from two seconds to ten seconds. Each of the free radical initiators, independently of each other free radical initiator, of any further thermosetting elastomeric composition that is molded at T1 has a half-life at T1 of at least about ten minutes, for example at least about 12 minutes or at least about 15 minutes or at least about 20 minutes or at least about 30 minutes. Any free radical initiator of a final portion of a further thermosetting elastomeric composition inserted into the mold before closing and heating the mold to heat the inserted portions to a second temperature T2, which final portion is molded to till a further area of the mold cavity during the heating to T2 step, may or may not have a half-life at T1 of at least about ten minutes.

The first thermosetting elastomer composition may be different from the second thermosetting elastomer composition because the first free radical initiator and the second free radical initiator are different from each other, or because the first and second thermosetting elastomer compositions contain different elastomers, or because one of the first and second thermosetting elastomer compositions contains a component not present in the other of the first second thermosetting elastomer compositions, or because the first and second thermosetting elastomer compositions contain different amounts of a component. In one example, the first free radical initiator and the second free radical initiator are different from each other or are the same free radical initiator but used in different concentrations in the first and second thermosetting elastomer compositions. The thermosetting elastomer compositions may alternatively each include the same free radical initiator or initiators, which may make it easier to ensure attaining a desired extent of cure without scorching in a desired amount of time at T2, an instead the compositions may differ in the amount or type of another component. In an embodiment of this example, an article is molded having one or more molded, cured first portions from the first thermosetting elastomer composition having a lower crosslink density than one or more molded, cured second portions from the second thermosetting elastomer composition. In another example, the first free-radically curable elastomer and the second free-radically curable elastomer are different from each other. In an embodiment of this example, an article (for example, an outsole for footwear) is molded having one or more molded, cured first portions from the first thermosetting elastomer composition having a higher traction or coefficient of kinetic friction than one or more molded, cured second portions from the second thermosetting elastomer composition. In another example, the difference between the first thermosetting elastomer composition and the second thermosetting elastomer composition includes at least a difference in pigmentation. in an embodiment of this example, an article is molded having one or more molded, cured first portions from the first thermosetting elastomer composition having a color different from one or more molded, cured second portions from the second thermosetting elastomer composition. Such an article may have molded, cured further portions having colors different from the color of any other molded, cured portions, for example such an article may have four differently colored molded, cured portions from the first thermosetting elastomer composition haying a first pigmentation, the second thermosetting elastomer composition having a second pigmentation, a third thermosetting elastomer composition having a third pigmentation, and a fourth thermosetting elastomer composition having a fourth pigmentation. The four differently colored, molded portions of the article (for example, an outsole for footwear) may be arranged in different zones in molding the article. For example, the molded thermosetting elastomer portions may be laterally adjacent one another in the molded article.

For example, all of the thermosetting elastomer compositions of the portions that are molded may contain a single free radical initiator that is the same for all of the thermosetting elastomer compositions.

The mold used in any of these methods may include areas defined by permanent or removable mold features for molding the plurality of thermosetting elastomer portions. For example, the mold may be an outsole mold having one or more traction element features, into which is or are molded a portion or portions of a first thermosetting elastomer composition formulated for better durability or traction, with a portion of a second thermosetting elastomer composition formulated for higher resilience being molded in an area or areas laterally adjacent to the traction element area or areas filled by the first thermosetting elastomer composition. The first portion, second portion, and any further portions of thermosetting elastomer compositions may also be molded in areas in the mad, each subsequent layer being molded in a different area. For example, the first, second, and any further thermosetting elastomer compositions may differ only in pigmentation (with adjustment in the amount of pigment in the rubber compound as needed to obtain a desired color) and molded successively in the mold to form, for example, a midsole or outsole for footwear.

The first thermosetting elastomer composition, second thermosetting elastomer composition, and any further thermosetting elastomer compositions are prepared by compounding at least one free-radically curable elastomer, at least one free radical initiator, and any further desired components. The elastomer compositions can be compounded using conventional rubber processing equipment. In a typical procedure, all components of the elastomer composition are mixed or kneaded in a Banbury mixer, optionally with further mixing on a roller mill, during which pigments such as carbon black may be incorporated, then calendered into a sheet. In another example, the thermosetting elastomer composition may be mixed and kneaded in a single- or twin-screw extruder, then extruded in a sheet or desired profile or injected into a mold to form the thermosetting elastomeric portion. A compounded elastomer sheet or profile may then be cut or otherwise shaped into a portion of a desired size for insertion into the mold for forming the article. Alternatively, the first portion and second portion may be successively injected into the mold, depending on the particular natures of the first and second thermosetting elastomer compositions.

The mold may be divided by ridges or other mold features into zonal areas for receiving the different thermosetting elastomer portions. The portions inserted in the mold may be from about 0.5 mm or from about 1 mm or from about 2 mm thick up to about 3 mm or up to about 4 mm or up to about 5 mm thick, or may having varying thicknesses in these ranges, and a regular or irregular perimeter suited to building up the article being molded. The mold can be divided into zonal areas for receiving thermosetting elastomer compositions that can be formulated to provide different functions in different areas of the molded article. For example, in the case of an outsole for footwear, the portions may have the general shape of an area of the mold which will form a traction element, a layer of a traction element, or layer or other portion in the shape of the outsole or part of the outsole, and the mold can have an zonal area for receiving each of those portions. For instance, the an area of the mold may be shaped to receive a portion of a high abrasion rubber formulation, another area of the mold may be shaped to receive a portion of a wet traction rubber formulation, while still another area of the mold may be shaped to receive a portion of a general purpose rubber formulation. The portions of these thermosetting elastomer compositions to be placed in the different areas of the mold can be cut from a flat sheet in the general shape of the areas of the mold into which each will be placed. For example, in the case of an outsole for footwear, the portions may have the general shape of a traction element, layer of a traction element, or layer or other portion in the shape of the outsole or part of the outsole. In the case of a midsole for footwear, the portions may generally be cut with a perimeter similar to the desired finished midsole article and molded in the disclosed methods in a layer of the midsole.

The first portion is inserted into the mold cavity, then heated at temperature T1 and molded to fill a first area in the mold cavity. The molding may be carried out, for example under pressure in a compression mold. The temperature T1 is a temperature at which each of the first thermosetting elastomer composition and the second thermosetting elastomer composition can be molded under a desired pressure in the mold cavity to fill a desired area of the mold cavity. The temperature T1 and molding pressure for each of the thermosetting elastomer compositions may depend on, for example, the particular thermosetting elastomer composition, including the type of elastomer, in the case of a copolymer the relative amounts of it comonomers, its weight average molecular weight, other components included in the elastomer composition. For example, thermosetting elastomer compositions including polybutadiene may be molded at a T1 in the range of from about 90° C. to about 130° C., depending on the grade of polybutadiene (for example, its cis, trans, and vinyl content). For a compression mold, the pressure during each molding step may be the same or may optionally be adjusted based on the thermosetting elastomer composition being molded. Each portion of thermosetting elastomer composition may be molded for up to about 40 seconds or for up to about 30 seconds, or from about 3 or from about 5 or from about 7 or from about 10 or from about 12 seconds up to about 40 or up to about 35 or up to about 30 or up to about 25 or up to about 23 or up to about 20 seconds, for example from about 3 to about 40 seconds or from about 5 to about 35 seconds for from about 10 to about 30 seconds or from about 10 to about 20 seconds.

T1 should be selected so that each thermosetting elastomer portion molded at T1 has no increase in torque at the first temperature of has an increase in torque at the first temperature that is less than 10%, or less than 5%, or less than 3%, of a total increase in torque realized at full cure while the mold temperature is maintained at T1.

The mold may include one or more overfill dams for collecting excess thermosetting elastomer composition for removal and to provide the molded article with well-defined areas filled by the thermosetting elastomer composition portions. After a portion is molded into an area in the mold cavity, the molded portion may be trimmed or any excess in the overflow dam may be removed. Then, after the first portion has been molded, the second portion is inserted into the mold and molded at T1, and after the second portion has been molded, any third portion may be inserted into the mold, and so on until the last portion being molded has been inserted into the mold. The last portion (which may be the second portion or a subsequent portion) is then inserted into the mold cavity at the first temperature T1. The mold is again closed, the last portion is optionally molded at the first temperature T1, after which the mold is heated, preferably rapidly heated, for example with induction heating, to heat the all portions to a second temperature T2 at which all portions are cured to provide the final, cured article. The mold is maintained at the second, curing temperature for a time required to complete the cure of the elastomer portions. When the cure of the elastomer portions is completed, the mold is opened and the cured, molded article is removed. The mold is then cooled to the first temperature, for example using convection cooling, to be ready for a next molding cycle at the first temperature.

A reinforcement fabric may be inserted into the mold cavity after the first portion has been molded and preferably before the last portion (which may be the second portion or a subsequent portion) is inserted into the mold. The last portion inserted into the mold may be molded at temperature T1, as the portions before were molded, or the last portion may be molded during heating the mold and curing the thermosetting elastomer composition molded portions at T2. Suitable reinforcement fabrics may be formed of natural and/or synthetic fibers. The reinforcement fabrics may be woven, nonwoven, knit or braided. As an example, a woven cotton canvas may be used for reinforcement.

It is generally desirable to heat the mold as quickly as possible to bring the portions to cure temperature T2, for example to shorten the time required to make the article. The mold can be heated to the second, curing temperature in a rapid heating method such as with the induction heating in from 1 second to 15 seconds or from 1 second to 12 seconds or from 1 second to 10 seconds or from 2 seconds to 10 seconds or from 2 seconds to 8 seconds or from 2 seconds to 7 seconds or from 2 seconds to 6 seconds or from 2 seconds to 5 seconds or from 3 seconds to 8 seconds or from 3 seconds to 7 seconds or from 3 seconds to 6 seconds or from 3 seconds to 5 seconds. The mold may be heated by induction heating, for example the mold may be heated for up to five seconds, or the mold may be heated from up to three seconds, or the mold may be heated for from about 2 to about 3 seconds. Then the mold is opened, the molded article is removed, and the mold is cooled again to T1, for example by convection cooling or quenching for molding a next article. Two molds may be used alternately in molding articles to allow for more cooling time. Thus, one mold cools while the next article is being molded in the second mold.

T1 and T2 are selected to be far enough apart so that the initiator or initiators of the first thermosetting elastomer, the second thermosetting elastomer, and any further thermosetting elastomers have a half-life at T1 of at least about ten minutes and a half-life at T2 of up to about one minute, but it may be desirable for T1 and T2 to not be further apart than necessary to minimize energy consumption and cycle time of the method.

Figure 1A:
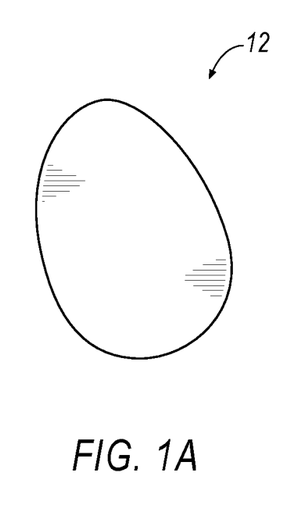
FIGS. 1A-1D illustrate example portions of thermosetting elastomer compositions.
Figure 1B:
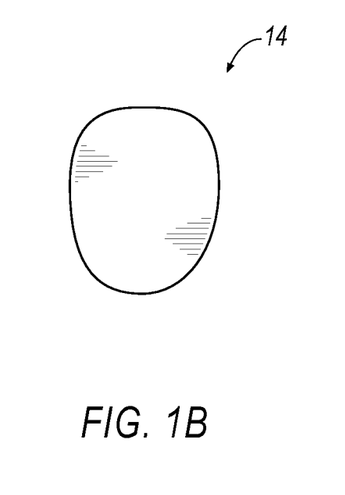
Figure 1C:
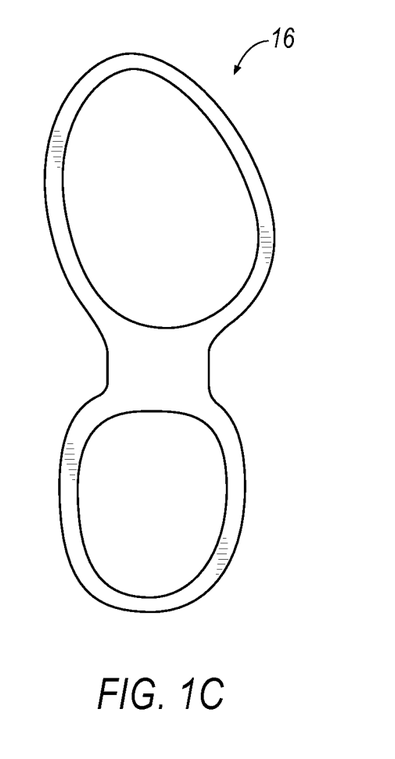
Figure 1D:
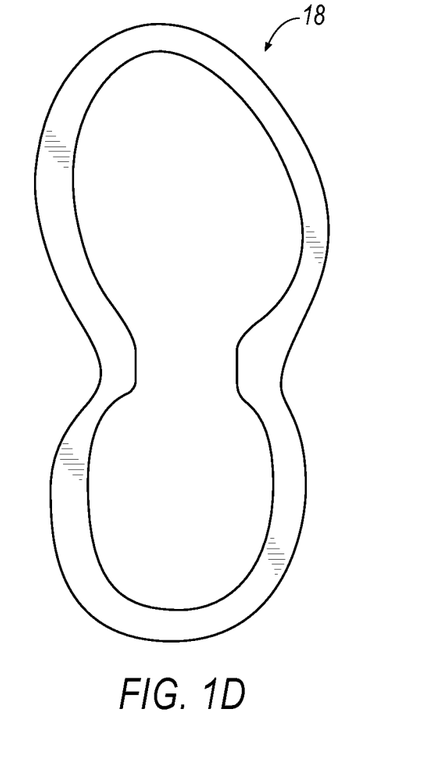

Referring now to the figures, FIGS. 1A to 1B show bottom views of thermosetting elastomer portions 12, 14, 16, and 18 for molding an outsole for an article of footwear. Portions 12 and 14 are die cut from a first sheet of a first thermosetting elastomer composition, which is a first thermosetting rubber compound, and portions 16 and 18 are die cut from a second sheet of a second thermosetting elastomer composition, which is a second thermosetting rubber compound. The first sheet and the second sheet both have a thickness of approximately 4 mm. Consequently, each of the thermosetting elastomer portions 12, 14, 16, and 18 has a thickness of approximately 4 mm. The first thermosetting elastomer composition is formulated to produce a cured rubber with better wet traction than the cured rubber of the second thermosetting elastomer composition, and the second thermosetting elastomer composition is formulated to produce a cured rubber with higher abrasion resistance than the cured rubber of the first thermosetting elastomer composition. The first thermosetting elastomer composition and the second thermosetting elastomer composition contain the same one free radical initiator. The first thermosetting elastomer composition and the second thermosetting elastomer composition contain pigments that are different from one another. The difference is a difference in pigment compounds (i.e., at least one of the first and second thermosetting elastomer compositions includes a pigment compound not included in the other), a difference in an amount of a pigment compound or in the total amount of pigment included in the compositions, or differences in a combination of these.

Figure 2:
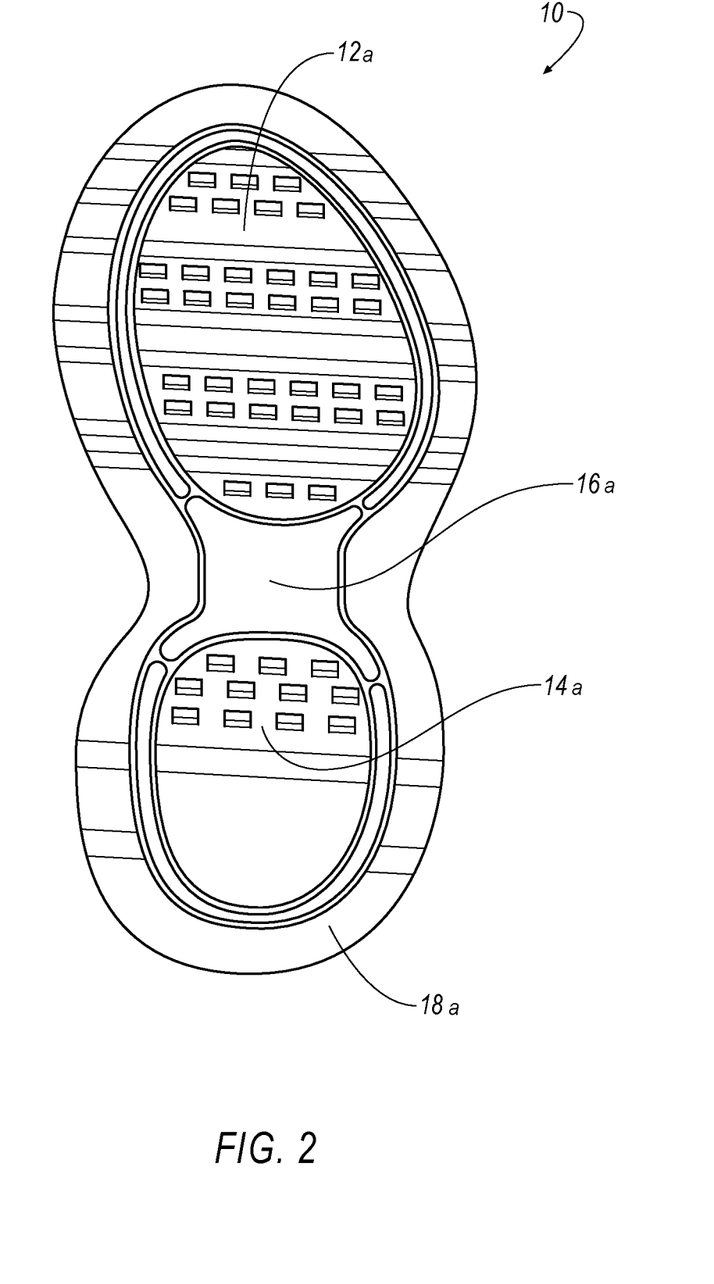
FIG. 2 is a bottom view of an example outsole molded from portions of FIGS. 1A-1D.

FIG. 2 shows a bottom view of a footwear outsole 10 molded from thermosetting elastomer portions 12, 14, 16, and 18. The outsole of FIG. 2 is made in a clamshell compression mold having an interior space in the shape of the outsole. A mold half that will produce the bottom face of the outsole illustrated in FIG. 2 has four zonal areas defined by ridges that will produce the character lines in outsole 10 surrounding areas 12a, 14a, 16a, and 18a of outsole 10. With the mold at a first temperature at which the free radical initiator (or, if more than one, each of the free radical initiators) of the first thermosetting elastomer composition and the second thermosetting elastomer composition has a half-life of at least about 10 minutes or at least about 12 minutes or at least about 15 minutes or at least about 20 minutes or at least about 30 minutes, for example a temperature in a range of from about 90° C. to about 130° C., thermosetting elastomer portions 12, 14 are placed in the mold, with portion 12 placed in a central forefoot area and portion 14 placed in a central heel area. The mold is closed and portions 12, 14 are molded, for example from about 10 seconds to about 30 seconds, under pressure, for example under a pressure of from about 140 to about 150 kg/cm². The mold is then opened and, if needed, the molded portions are trimmed so as not to extend outside of their respective zonal areas. Thermosetting elastomer portion 16 is then placed in the mold in a zonal area surrounding and abutting the molded portions 12, 14. As before, the mold is closed and portion 16 is molded, for example from about 10 seconds to about 30 seconds, under pressure, for example under a pressure of from about 140 to about 150 kg/cm². The mold is then opened and, if needed, the molded portion 16 is trimmed before placing thermosetting elastomer portion 18 in the mold in a zonal area surrounding molded portion 16 in the fourth and final zonal area of the mold. At this point, the increase in torque of each of the compositions of portions 12, 14, and 16 is less than 10%, or less than 5%, or less than 3%, of a total increase in torque realized at full cure for their respective compositions. Then, the mold is closed and heated, preferably rapidly, to a cure temperature, for example in a range of from about 155° C. to about 170° C. and for a time, for example from about 2 to about 3 minutes, under pressure (e.g., 140 to about 150 kg/cm²) to cure the molded portions 12, 14, 16, and 18 into cured elastomer areas 12a, 14a, 16a, and 18a that make up outsole 10. Curing at the cure temperature is carried out in the usual manner.

Figure 3:
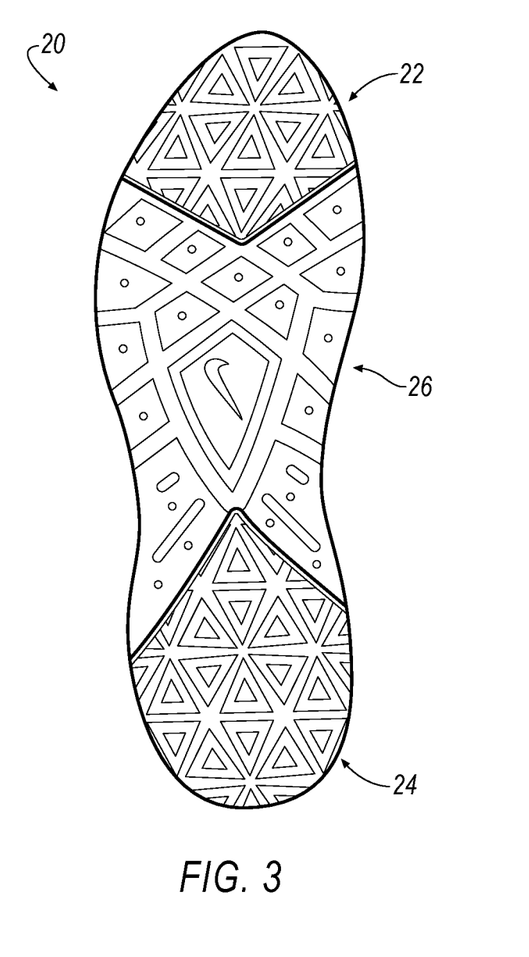
FIG. 3 is a bottom view of an alternative outsole.

FIG. 3 show an alternative outsole 20 having a forefoot region 22, midfoot region 26, and heel region 24. Forefoot region 22 and heel region 24 are molded from a first thermosetting elastomer composition formulated to produce a cured rubber with higher abrasion resistance than the cured rubber of a second thermosetting elastomer composition, and midfoot region 26 is molded from the second thermosetting elastomer composition, which is formulated to produce a cured rubber with better wet traction than the cured rubber of the first thermosetting elastomer composition. With the mold at a first temperature, for example a temperature in a range of from about 90° C. to about 110° C., a thermosetting elastomer portion of the second thermosetting elastomer composition in the shape of midfoot region 26 and being about 3 mm to about 5 mm thick is placed in the midfoot area of the mold. The free radical initiator (or, if more than one, each of the free radical initiators) of the second thermosetting elastomer composition has a half-life of at least about 10 minutes or at least about 12 minutes or at least about 15 minutes or at least about 20 minutes or at least about 30 minutes at this mold temperature. The mold is closed and the midfoot portion is molded (but not cured) in midfoot region 22, for example for a period of time from about 15 seconds to about 25 seconds under a pressure of from about 140 to about 150 kg/cm². The mold is then opened and, if needed, the molded midfoot portion is trimmed so as not to extend outside of the midfoot area of the mold. Then, thermosetting elastomer portions of the first thermosetting elastomer composition in the shapes of forefoot region 22 and heel region 24, each also being about 3 mm to about 5 mm thick, are placed in their respective forefoot and heel areas of the mold. At this point, the increase in torque of the composition in midfoot region 26 is less than 10%, or less than 5%, or less than 3%, of a total increase in torque realized at full cure for the composition. The mold is closed and rapidly heated to a temperature for curing the thermosetting elastomer portions. For example, the outsole may be cured for from about 2 to about 3 minutes at a temperature in a range of from about 160° C. to about 170° C. and under a pressure of from about 140 to about 150 kg/cm².

Figure 4:
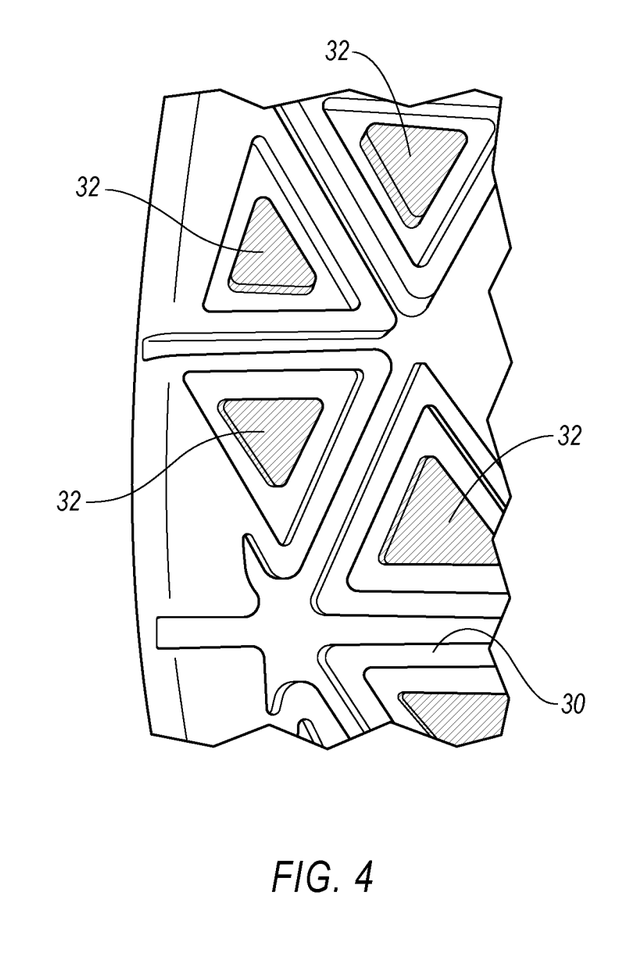
FIG. 4 is a sectional, bottom perspective view of an alternative outsole.

FIG. 4 illustrates shows a partial vie of an alternative outsole 20 made by molding toe region 22 and heel region 24 in which triangular lugs 32 set in surrounding rubber zone 30. Triangular lugs 32 are cut from a third thermosetting elastomer composition sheet having the base rubber used in the second thermosetting elastomer composition and a pigment content (type and amount) of one or more pigment compounds that is different from both the pigment content of the first thermosetting elastomer composition and the second thermosetting elastomer composition. Surrounding rubber zone is cut from the first thermosetting elastomer composition in the shapes of forefoot region 22 and heel region 24, but with cut with triangular holes corresponding to areas for lugs 32. All of regions 22 and 24 and lugs 32 can be about 3 mm to about 5 mm thick. After the midfoot portion is molded and optionally trimmed, the lug portions cut from the third thermosetting elastomer composition sheet are set in the mold in areas for lugs 32. The mold is then closed and the triangular lugs 32 are molded under the same molding conditions for midfoot region 22. Then, the mold is opened, the molded lugs are optionally trimmed, and the surrounding rubber zone material in the shapes of forefoot region 22 and heel region 24. At this point, the increase in torque of the composition in midfoot region 26 and of the composition of the lug portions are less than 10%, or less than 5%, or less than 3%, of a total increase in torque realized at full cure for those respective compositions. The mold is closed and heated to the curing temperature, and the outsole is cured as described before.

Alternatively, the lug portions may be placed in the mold areas for lugs 32 at the same time the midfoot portion for midfoot region 22 is placed in the mold, with the lug portions and midfoot portion being molded at the same time. Then, with the torques of the molded compositions remaining less than 10%, or less than 5%, or less than 3%, of a total increase in torque realized at full cure for those compositions, the molded portions are optionally trimmed, the surrounding rubber zone materials are placed in forefoot region 22 and heel region 24, the mold is closed and the outsole is cured as before.

After curing, the molded article is removed from the mold and may be trimmed or undergo other finishing steps.

Suitable examples of elastomers that may be used as the first free-radically curable elastomer, second free-radically curable elastomer, and any further free-radically curable elastomers include polyisoprene and natural rubbers (NR) including hevea and guayule rubbers, polybutadiene, styrene-butadiene copolymers, acrylonitrile-butadiene copolymers (NBR or nitrite butadiene), butadiene-propylene copolymers, butadiene-ethylene copolymers, butadiene-isoprene copolymers, isobutylene-isoprene copolymer (butyl rubber or IIR), brominated isobutylene-isoprene copolymer (bromobutyl rubber), ethylene-propylene-diene (EPDM) copolymers such as ethylene-propylene-cyclopentadiene terpolymer, ethylene-propylene-5-ethylidene-norbornene terpolymer, and ethylene-propylene-1,4-hexadiene terpolymer, isoprene-isobutylene copolymers, and other free-radically curable elastomers such as copolymers of ethylene and vinyl acetate (EVA), ethylene-propylene copolymers (EPR or EPM), chlorinated and chlorosulfonated polyethylenes (CM, CSM), silicone elastomers, and fluorocarbon elastomers, and combinations of these.

The elastomer polymers of the molded portions can be selected to provide desired properties to the cured elastomer article in the location of the molded portion. For example, an elastomer polymer or combination of elastomer polymers may be used that provide increased wet traction, improved abrasion resistance, lower marking, or that is transparent.

The first thermosetting elastomer composition comprises a first free radical initiator or initiators and the second thermosetting elastomer composition comprises a second free radical initiator or initiators. The first free radical initiators) and the second free radical initiator(s), and any further free radical initiators of any further thermosetting elastomer compositions used in the method, may be the same or different from one another and, if the same, has or if different each is independently selected to have, a half-life at T1 of at least about ten minutes, for example at least about 12 minutes or at least about 15 minutes or at least about 20 minutes or at least about 30 minutes. For example, the (if the same) or each if different) free radical initiator may have a half-life at T1 of from 10 minutes to 100 minutes, or from 10 minutes to 80 minutes, or from 10 minutes to 60 minutes, or from 10 minutes to 50 minutes, or from 10 minutes to 45 minutes, or from 10 minutes to 40 minutes, or from 10 minutes to 30 minutes, or from 12 minutes to 100 minutes, or from 12 minutes to 80 minutes, or from 12 minutes to 60 minutes, or from 12 minutes to 50 minutes, or from 12 minutes to 45 minutes, or from 12 minutes to 40 minutes, or from 12 minutes to 30 minutes, or from 15 minutes to 100 minutes, or from 15 minutes to 80 minutes, or from 15 minutes to 60 minutes, or from 15 minutes to 50 minutes, or from 15 minutes to 45 minutes, or from 15 minutes to 40 minutes, or from 15 minutes to 30 minutes, or from 20 minutes to 100 minutes, or from 20 minutes to 80 minutes, or from 20 minutes to 60 minutes, or from 20 minutes to 50 minutes, or from 20 minutes to 45 minutes, or from 20 minutes to 40 minutes, or from 20 minutes to 30 minutes, or from 30 minutes to 100 minutes, or from 30 minutes to 80 minutes, or from 30 minutes to 60 minutes, or from 30 minutes to 50 minutes, or from 30 minutes to 45 minutes, or from 30 minutes to 40 minutes. The first free radical initiator or initiators may be selected from peroxides such as dialkyl peroxides, diacyl peroxides, peroxyesters, peroxyketals, peroxydicarbonates, peroxymonocarbonates, hydroperoxides, and azo free radical initiators having the selected half-life at T1. Each free radical initiator included in thermosetting elastomer portions molded at T1 has a long enough half-life such that during the molding time the first thermosetting elastomer portion is not cured or not significantly cured such that the first thermosetting elastomer portion has no increase in torque at the first temperature or has an increase in torque at the first temperature that is less than 10%, or less than 5%, or less than 3%, of a total increase in torque realized at full cure.

in production, it is desirable to minimize cycle time, and, for this reason, T2 may he selected to be as close to T1 as practical to minimize the time required to heat the first thermosetting elastomer composition and the second thermosetting elastomer composition from T1 to T2. However, once an initiator is selected, T2 should be at least the temperature at which that initiator has a half life of about one minute so that the article cures in a span of time that is reasonable for commercial production of the article.

Particular examples of suitable organic peroxides include, but are not limited to, di-tert-amyl peroxide; di-tert-butyl peroxide; dicumyl peroxide; 2,5-dimethyl-2,5-di(tert-butylperoxy)hexyne-3; tert-butyl peroxybenzoate; tert-amyl peroxyacetate; tert-amylperoxy 2-ethylhexyl carbonate; 1,1-(di(t-butylperoxy)-3,3,5-trimethylcyclohexane); 1,1-di(tert-amylperoxy)cyclohexane; 1,1-di(tert-butylperoxy)cyclohexane; tert-butyl peroxyisobutyrate; tert-butyl peroxydiethylacetate; tert-butyl peroxy-2-ethylhexanoate; tert-amyl peroxy-2-ethylhexanoate; dibenzoyl peroxide; 1,1,3,3-tetramethylbutyl peroxy-2-ethylhexanoate; 2,5-dimethyl-2,5-di(ethylhexanoylperoxy)hexane; didecanoylperoxide; and combinations of these that provide the required half-lives at T1 and T2. In a particular example, each of the thermosetting elastomer compositions may contain 1,1-(di (t-butylperoxy)-3,3,5-trimethylcyclohexane) as the sole free radical initiator, T1 may be from about 110° C. to about 120° C., and T2 may be from about 155° C. to about 170° C. In another particular example, a thermosetting elastomer compositions may contain di-t-butyl peroxide, T1 may be from about 130° C. to about 150° C., and T2 may be from about 195° C. to about 205° C. In another particular example, a thermosetting elastomer compositions may contain 1,1,3,3-tetramethylbutyl peroxy-2-ethylhexanoate, T1 may be from about 95° C. to about 105° C., and T2 may be from about 130° C. to about 145° C.

The thermosetting elastomer compositions may include one or more crosslinkers such as metal salts of ethylenically unsaturated acids, for example zinc diacrylate and magnesium dimethacrylate; polyacrylates and polymethacrylates such as polybutadiene diacrylate, ethylene glycol dimethacrylate, and trimethylolpropane triacrylate; triallylcyanurate; triallyl isocyanurates; and the like.

The thermosetting elastomer composition may include any of a wide variety of black, white, or colored pigments. Nonlimiting examples of suitable pigments include carbon black, titanium dioxide, iron oxide pigments such as black iron oxide and red iron oxide, zinc oxide, monoazo and diazo pigments, cobalt blue, ultramarine blue, bismuth vanadate yellow, azo metal complexes, copper phthalocyanines, anthraquinones, quinacridones, dioxazines, perylene pigments, and thioindigo pigments, which may be used in any combination. Pigments are typically selected and used in the amount required to obtain the desired color and color strength.

Fillers may be used in the thermosetting elastomer compositions to enhance properties, to save money, to facilitate processing, to improve physical properties, or for other reasons. Such fillers include silica, carbon black (which also functions as a pigment), clay, talc, calcium sulfate, calcium silicate, graphite, glass, mica, calcium metasilicate, barium sulfate, zinc sulfide, aluminum hydroxide, diatomaceous earth, carbonates (such as calcium carbonate, magnesium carbonate and the like), metals (such as titanium, tungsten, zinc, aluminum, bismuth, nickel, molybdenum, iron, copper, brass, boron, bronze, cobalt, beryllium, and alloys of these), metal oxides (such as zinc oxide, iron oxide, aluminum oxide, titanium oxide, magnesium oxide, zirconium oxide and the like), particulate synthetic plastics (such as high molecular weight polyethylene, polypropylene, polystyrene, polyethylene ionomeric resins, polyamide, polyester, polyurethane, polyimide, and the like), as well as organic fiber such as cotton flock, cellulose flock, cellulose pulp, leather fiber, and combinations of any of these. Typical levels of fillers include from about 10 phr to 100 phr or higher. In various embodiments, the compositions contain from about 10 to about 80, from about 30 to about 70, from about 40 to about 60, from about 50 to about 60, or from about 35 to about 60 phr filler. Typically filler levels for footwear outsoles are from about 10 to about 80 phr filler, for example from 20 phr to about 60 phr silica may be used.

The thermosetting elastomer compositions may include a process oil to facilitate both compounding and processing. Process oils may come from petroleum, plant, or animal sources. The petroleum process oils may be hydrotreated to remove a large portion of the aromatic compounds. Petroleum-based oils can be selected from the group consisting of paraffinic oils, naphthenic oils, and aromatic oils. The non-petroleum-based oils may contain a sufficient level and distribution of fatty acid side chains to partially incorporate into the rubber composition at low levels or to act as internal plasticizers at higher levels. The oils derived from plant or animal sources can be classified by their iodine number. Plant- and animal-derived oils may contain double bonds, and each double bond can react with one iodine molecule.

The iodine number, defined as the number of grams of iodine taken up by 100 grams of oil, gives a rough measure of the number of double bonds in an oil. The oil may have an iodine number of greater than 50 and, preferably, greater than 60. During crosslinking the double bonds are available for reaction with the unsaturated elastomer molecules. In another aspect, these oils are triglycerides of one or more unsaturated fatty acids. Such a plant- or animal-derived oil is capable of effectively crosslinking an unsaturated elastomer during crosslinking if the oil molecule contains a double bond on two or more of the three fatty acid side chains in an oil molecule. Preferred oils may have at least 50% of the fatty acid side chains with one or more sites of unsaturation. In this way, the unsaturated oils can facilitate processing of the rubber during the compounding phase and can be incorporated into the rubber network during the curing phase to enhance the physical properties of the rubber composition and prevent blooming.

In some embodiments the elastomer composition contains less than 5 phr (parts by weight per hundred parts of elastomer) of the process oil, preferably less than or equal to 3 phr. The rubber elastomer composition may contain from about 0.1 to about 5 phr of vegetable oil. In other embodiments, the elastomer compounds contain a maximum of 3 phr vegetable oil, or less than 3 phr. In other embodiments, the elastomer compounds may contain from 0.1 to 2 phr vegetable oil. Non-limiting examples of vegetable oils include peanut oil, sunflower oil, cottonseed oil, linseed oil, soybean oil, rapeseed oil, sesame oil, safflower oil, poppy seed oil, tung oil, wheat oil, olive oil, corn oil, castor oil, guayule seed oil, and mixtures thereof. Castor oil has unique chemistry in that it is the only source of an 18 carbon hydroxylated fatty acid with one double bond (12-hydroxyoleic acid or ricinoleic acid). This fatty acid consistently comprises about 90 wt. % of castor oil.

The elastomer compositions may further include various additives such as coupling agents, titanium or zirconium compounds, antioxidants, antiozonants, UV inhibitors, and the like.

The elastomer compositions may contain coupling agents, such as those based on silanes. For example, athletic footwear have rubber outsoles that are generally prepared from silica filled rubber compositions by heating the compositions for suitable times and temperatures in compression molds. Silane coupling agents are commonly used to compatibilize the rubber resins with the filler and improve the physical properties. When present, the silane coupling agents may contribute to the stability and physical properties of the compositions, for example by compatibilizing or coupling the reinforcing filler with the rubber components. Silane coupling agents include those with amino, epoxy, (meth)acryl, chloro, and vinylyl functionality.

The methods may be used to prepare a wide variety of articles. Non-limiting examples of such articles include footwear, hoses, belts, gaskets, vibration damping fixtures and industrial products, gloves, catheters, and other medical devices, and commodity items such as tires or parts or elements used in making such articles. The disclosed methods may be used, for example, to make footwear, outsoles or other components for footwear, grip tape, for example for skateboards, hand grips, for example for golf clubs and tools, covers for sport balls, yoga mats, palms of gloves, especially sport gloves like soccer goalie gloves, traction elements for a conveyor belts, floor mats, pads or traction elements for floor coverings, knob covers, and other applications.

The description is merely exemplary in nature and, thus, variations that do not depart from the gist of the disclosure are a part of the invention. Variations are not to be regarded as a departure from the spirit and scope of the disclosure.

What is claimed is:

1. A method of molding an outsole for footwear, comprising:
   providing a first portion of a first thermosetting elastomer composition comprising a first free-radically curable elastomer and a first free radical initiator and a second portion of a second thermosetting elastomer composition comprising a second free-radically curable elastomer and a second free radical initiator, wherein the first thermosetting elastomer composition is different from the second thermosetting elastomer composition, and wherein the first free-radically curable elastomer and the second free-radically curable elastomer are selected from polyisoprene, polybutadiene, styrene-butadiene copolymers, acrylonitrile-butadiene copolymers, butadiene-propylene copolymers, butadiene-ethylene copolymers, butadiene-isoprene copolymers, isobutylene-isoprene copolymers, brominated isobutylene-isoprene copolymers, ethylene-propylene-diene copolymers, isoprene-isobutylene copolymers, ethylene vinyl acetate copolymers, ethylene-propylene copolymers, chlorinated and chlorosulfonated polyethylenes, fluorocarbon elastomers, and combinations thereof;
   inserting the first portion into a mold cavity of a mold that is at a first temperature T1, wherein T1 is above the glass transition temperature of the first elastomer and wherein the first free radical initiator has a half-life at T1 of at least about ten minutes;
   heating and molding the first portion to fill a first area of the mold cavity;
   inserting the second portion into the mold cavity at the first temperature T1;
   closing the mold;
   heating the mold to heat the first and second portions to a second temperature T2 and curing the first and second portions;
   and opening the mold and removing the outsole for footwear;
   wherein the second portion is heated and molded to fill a second area of the mold cavity either at T1 or during or after heating the mold to T2 and
   wherein the first free radical initiator and the second free radical initiator may be the same or different and, if the same, has or, if different, each independently has a half-life at T2 of up to about one minute.

2. A method of molding an outsole for footwear according to claim 1, wherein the step of heating the mold to T2 lasts for from 2 to 5 seconds.

3. A method according to claim 1, wherein the second area of the mold cavity filled by the second portion at least partially overlies the first area of the mold cavity filled by the first portion.

4. A method of molding an outsole for footwear according to claim 3, further comprising inserting a reinforcement fabric into the mold cavity optionally over at least a portion of the first area of the mold cavity filled by the first portion before inserting the second portion of the second thermosetting elastomer composition into the mold cavity, wherein the second area of the mold cavity filled by the second portion at least partially overlies the reinforcement fabric.

5. A method according to claim 1, wherein the second area of the mold cavity filled by the second portion abuts the first area of the mold cavity filled by the first portion.

6. A method of molding an outsole for footwear according to claim 1, wherein the second portion is heated and molded to fill a second area of the mold cavity before heating the mold and wherein the second free radical initiator has a half-life at T1 of at least about ten minutes.

7. A method of molding an outsole for footwear according to claim 1, wherein the mold is heated with induction heating to heat the first elastomer composition and the second elastomer composition to the second temperature T2.

8. A method of molding an outsole for footwear according to claim 1, wherein the first free radical initiator has a half-life at T1 of at least about twenty minutes.

9. A method of molding an outsole for footwear according to claim 1, wherein each of the first free radical initiator and the second free radical initiator has a half-life at T2 of not more than about 20 seconds.

10. A method of molding an outsole for footwear according to claim 1, wherein the first free radical initiator and the second free radical initiator are the same.

11. A method of molding an outsole for footwear according to claim 1, wherein the first area into which the first portion is inserted has an overflow dam, wherein the method further comprises removing overflow of the first thermosetting elastomer composition from the overflow dam of the first area before inserting the portion of the second thermosetting elastomer composition.

12. A method of molding an outsole for footwear according to claim 11, further comprising heating and molding the second portion to fill a second area of the mold cavity before heating the mold and removing overflow of the second thermosetting elastomer composition from the overflow dam of the second portion before heating the mold to the second temperature T2, wherein the second free radical initiator has a half-life at T1 of at least about ten minutes.

13. A method according to claim 12, further comprising:
   providing a third thermosetting elastomer composition comprising a third free-radically curable elastomer and a third free radical initiator, wherein the third thermosetting elastomer composition is different from the second thermosetting elastomer composition;
   after removing overflow of the second thermosetting elastomer composition from the overflow dam of the second portion, inserting a third portion of the third thermosetting elastomer composition into the mold cavity at the first temperature T1 before closing the mold and heating the mold to heat the first elastomer composition, the second elastomer composition, and the third elastomer composition to T2 and curing the first elastomer composition, the second elastomer composition, and the third elastomer composition, wherein the third portion is heated and molded to fill a third area of the mold cavity before or during heating the mold and wherein the third free radical initiator has a half-life at T2 of less than about one minute.

14. A method according to claim 13, wherein the third area of the mold cavity filled by the third portion at least partially overlies or abuts at least one of the first area of the mold cavity filled by the first portion and the second area of the mold cavity filled by the second portion.

15. A method of molding an outsole for footwear according to claim 13, wherein the difference between the first thermosetting elastomer composition and the third thermosetting elastomer composition comprises at least a difference in pigmentation or a difference in elastomer polymer type or amount.

16. A method of molding an outsole for footwear according to claim 13, wherein each of the first portion, the second portion, and the third portion is independently from about 1 mm to about 4 mm thick, wherein each of the first thermosetting elastomer composition, the second thermosetting elastomer composition, and the third thermosetting elastomer composition differs at least in pigmentation from each other of the first thermosetting elastomer composition, the second thermosetting elastomer composition, and the third thermosetting elastomer composition, and further wherein the third area at least partially overlies the second area and the second area at least partially overlies the first area.

17. A method of molding an outsole for footwear according to claim 1, wherein one of the first area and the second area has greater abrasion resistance or better wet traction than the other of the first area and the second area.

18. A method of molding an outsole for footwear according to claim 17, wherein the first area has the greater abrasion resistance or better wet traction and the second area overlies the first area.

19. A method of molding an outsole for footwear according to claim 1, wherein after the outsole for footwear is removed from the mold the mold is cooled again to T1 by convection cooling or quenching.

20. A method of molding an outsole for footwear according to claim 1, wherein the first temperature T1 is selected so that the first thermosetting elastomer molded at T1 has an increase in torque that is less than 10% of a total increase in torque realized at full cure.

21. A method of molding an outsole for footwear according to claim 1, wherein the difference between the first thermosetting elastomer composition and the second thermosetting elastomer composition comprises at least a difference in pigmentation.

22. A method of molding an outsole for footwear according to claim 1, wherein the difference between the first thermosetting elastomer composition and the second thermosetting elastomer composition comprises at least a difference in elastomer polymer type or amount.

23. A method according to claim 1, wherein each of the first portion and the second portion is independently from about 1 mm to about 4 mm thick.

24. A method of molding an outsole for footwear according to claim 1, wherein each of the first portion and the second portion is independently from about 1 mm to about 4 mm thick and the difference between the first thermosetting elastomer composition and the second thermosetting elastomer composition comprises a difference in pigmentation.

* * * * *